(12) United States Patent
Barton et al.

(10) Patent No.: US 11,258,694 B2
(45) Date of Patent: Feb. 22, 2022

(54) PROVIDING DYNAMIC ROUTING UPDATES IN FIELD AREA NETWORK DEPLOYMENT USING INTERNET KEY EXCHANGE V2

(71) Applicant: CISCO TECHNOLOGY, INC., San Jose, CA (US)

(72) Inventors: Robert Edgar Barton, Richmond (CA); Patrick Grossetete, Marcoussis (FR); Laurent Aubert, Grenoble (FR); Frederic Detienne, Harze (BE); Graham Bartlett, Plymouth (GB); Amjad Inamdar, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 963 days.

(21) Appl. No.: 15/398,601

(22) Filed: Jan. 4, 2017

(65) Prior Publication Data

US 2018/0191669 A1    Jul. 5, 2018

(51) Int. Cl.
| | | |
|---|---|---|
| *H04L 12/751* | (2013.01) | |
| *H04L 29/12* | (2006.01) | |
| *H04L 45/02* | (2022.01) | |
| *H04L 61/251* | (2022.01) | |
| *H04L 101/668* | (2022.01) | |

(52) U.S. Cl.
CPC .......... *H04L 45/02* (2013.01); *H04L 61/251* (2013.01); *H04L 61/6068* (2013.01)

(58) Field of Classification Search
CPC .... H04L 45/02; H04L 61/251; H04L 61/6068
See application file for complete search history.

(56) References Cited

U.S. PATENT DOCUMENTS

| | | | | |
|---|---|---|---|---|
| 6,542,496 | B1 * | 4/2003 | Hirota | H04L 45/08 370/351 |
| 7,478,427 | B2 * | 1/2009 | Mukherjee | H04L 12/4633 709/228 |
| 7,500,102 | B2 * | 3/2009 | Swander | H04L 29/1249 709/230 |
| 7,602,737 | B2 | 10/2009 | Asati et al. | |

(Continued)

OTHER PUBLICATIONS

Kaufman, C., et al., "Internet Key Exchange Protocol Version 2 (IKEv2)," Internet Engineering Task Force, RFC 7296, Oct. 2014, 142 pages; https://www.rfc-editor.org/pdfrfc/rfc7296.txt.pdf.

(Continued)

*Primary Examiner* — Huy D Vu
*Assistant Examiner* — Bailor C. Hsu

(57) ABSTRACT

A method is described and in one embodiment includes identifying at an initiator element a list of Internet protocol ("IP") prefixes corresponding to routes designated as interesting routes, wherein the IP prefixes are included in a Routing Information Base ("RIB") of the initiator; monitoring the RIB for a change in the list of IP prefixes; and, responsive to detection of a change in the list of IP prefixes, injecting at least a portion of the changed list of IP prefixes into a payload of an IKEv2 NOTIFY message and sending the IKEv2 NOTIFY message to a responder element peered with the initiator element, wherein the responder element updates an RIB of the responder element using the IP prefixes included in the received IKEv2 NOTIFY message.

20 Claims, 7 Drawing Sheets

(56) References Cited

U.S. PATENT DOCUMENTS

| | | | | |
|---|---|---|---|---|
| 7,644,171 | B2* | 1/2010 | Sturniolo | H04L 69/161 709/230 |
| 7,779,152 | B2* | 8/2010 | Narayanan | H04L 12/4641 709/227 |
| 7,987,506 | B1* | 7/2011 | Khalid | H04L 63/0272 726/15 |
| 8,014,319 | B2* | 9/2011 | Hei | H04L 45/12 370/255 |
| 8,312,152 | B2* | 11/2012 | Dubs | H04L 61/2046 709/228 |
| 8,321,586 | B2* | 11/2012 | Matsuo | H04L 29/12301 709/238 |
| 8,688,970 | B2* | 4/2014 | Bachmann | H04L 63/0428 713/151 |
| 8,788,826 | B1* | 7/2014 | Zhao | H04L 29/12283 713/162 |
| 8,831,595 | B2* | 9/2014 | Uchida | H04W 48/18 455/425 |
| 8,931,595 | B2* | 1/2015 | Koma | F16N 11/04 184/5.1 |
| 8,964,697 | B2* | 2/2015 | Sugizaki | H04W 36/0016 370/331 |
| 9,363,227 | B2* | 6/2016 | Wijnands | H04L 61/25 |
| 9,887,936 | B2* | 2/2018 | Maino | H04L 47/825 |
| 2002/0165980 | A1* | 11/2002 | Brown | H04L 12/5602 709/242 |
| 2004/0090913 | A1* | 5/2004 | Scudder | H04L 45/54 370/219 |
| 2005/0135286 | A1* | 6/2005 | Nurminen | H04W 84/18 370/310 |
| 2005/0213574 | A1* | 9/2005 | Yoshimura | H04L 12/4633 370/389 |
| 2007/0006295 | A1* | 1/2007 | Haverinen | H04L 63/0428 726/14 |
| 2007/0014275 | A1* | 1/2007 | Bettink | H04L 47/10 370/351 |
| 2008/0219218 | A1* | 9/2008 | Rydnell | H04W 92/02 370/331 |
| 2009/0175194 | A1* | 7/2009 | Akhter | H04L 41/0803 370/254 |
| 2010/0027474 | A1* | 2/2010 | Hirano | H04L 45/00 370/328 |
| 2010/0042712 | A1* | 2/2010 | Lindem, III | G06F 15/16 709/223 |
| 2011/0023090 | A1* | 1/2011 | Asati | H04L 12/4633 726/4 |
| 2011/0103260 | A1* | 5/2011 | Jeyatharan | H04W 60/005 370/254 |
| 2011/0110306 | A1* | 5/2011 | Yajima | H04W 40/20 370/328 |
| 2011/0134869 | A1* | 6/2011 | Hirano | H04L 29/12311 370/329 |
| 2011/0216743 | A1* | 9/2011 | Bachmann | H04L 63/164 370/331 |
| 2015/0100784 | A1* | 4/2015 | Ido | H04L 9/32 713/168 |
| 2016/0012699 | A1* | 1/2016 | Lundy | G08C 17/02 340/521 |
| 2016/0080211 | A1 | 3/2016 | Anand et al. | |
| 2016/0098327 | A1 | 4/2016 | Detienne et al. | |
| 2016/0345159 | A1 | 11/2016 | Weniger et al. | |
| 2017/0195181 | A1* | 7/2017 | Birmiwal | H04L 41/12 |

OTHER PUBLICATIONS

Cisco Systems, "ASR9000/XR: Understanding and using RPL (Route Policy Language)," Cisco Community, Jan. 20, 2012, 48 pages.

T. Kivinen, et al., "Generic Raw Public-Key Support for IKEv2," Internet Engineering Task Force (IETF), Request for Comments: 7670, Updates: 7296, Category: Standards Track, ISSN: 2070-1721, Jan. 2016, 10 pages.

T. Kivinen, et al., "Signature Authentication in the Internet Key Exchange Version 2 (IKEv2)," Internet Engineering Task Force (IETF), Request for Comments: 7427, Updates: 7296, Category: Standards Track, ISSN: 2070-1721, Jan. 2015, 18 pages.

C. Kaufman, et al., "Internet Key Exchange Protocol Version 2 (IKEv2)," Internet Engineering Task Force (IETF), Request for Comments: 5996, Obsoletes: 4306, 4718, Category: Standards Track, ISSN: 2070-1721, Sep. 2010, 138 pages.

* cited by examiner

```
                    1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
! Next Payload  !C! RESERVED  !         Payload Length         !
+-+-+-+-+-+-+-+-+-+-+-+-+-+-+-+-+-+-+-+-+-+-+-+-+-+-+-+-+-+-+-+-+
! Protocol ID  !   SPI Size   !      Notify Message Type       !
+-+-+-+-+-+-+-+-+-+-+-+-+-+-+-+-+-+-+-+-+-+-+-+-+-+-+-+-+-+-+-+-+
!                                                              !
~              Security Parameter Index (SPI)                  ~
!                                                              !
+-+-+-+-+-+-+-+-+-+-+-+-+-+-+-+-+-+-+-+-+-+-+-+-+-+-+-+-+-+-+-+-+
!                                                              !
~                       Notification Data                      ~
!                                                              !
+-+-+-+-+-+-+-+-+-+-+-+-+-+-+-+-+-+-+-+-+-+-+-+-+-+-+-+-+-+-+-+-+
```

FIG. 5

PROVIDING DYNAMIC ROUTING UPDATES IN FIELD AREA NETWORK DEPLOYMENT USING INTERNET KEY EXCHANGE V2

TECHNICAL FIELD

This disclosure relates in general to the field of communications networks and, more particularly, to techniques for providing dynamic routing updates in Field Area Network ("FAN") deployments using Internet Key Exchange v2("IKEv2").

BACKGROUND

Last mile access networks have gained considerable momentum over the past few years because of their prominent role in Internet of Things ("IOT") infrastructures, such as smart grid, smart cities, etc. As a result, Field Area Networks ("FANs"), which may be defined as the combination of Field Area Routers ("FARs") that connect access networks, local devices to secured IP backhaul through WAN interface(s), have emerged as a central component. FANs are typically based on a hub-and-spoke Virtual Private Network ("VPN") topology that includes a hub router connected to grid router "spokes." Due to the large scale of IOT networks, there may be anywhere from a few hundred to tens of thousands of spoke routers connected to a cluster of hub routers via VPN tunnels. The backhaul of the routers is mostly implemented over public or private wireless networks, such as a cellular, WiMax, and satellite. Due to the scale of these networks and the cost of wireless links, FANs are customarily deployed with fine grained tuning of control plane protocol, for example IP static routes definition between the hub and spoke routers instead of verbose dynamic IP routing protocols, to avoid the inherent cost incurred from control plane protocol back ground traffic, such a routing updates, topology changes, keep-alives, etc., the cost of which may be very impactful over time.

With the advent of low-cost field device routers (such as IEEE 802.15.4-2015 Industrial WPAN routers) that support IPv6 networks across mesh topologies (such as promoted by the Wi-SUN alliance), IP static routing is not suitable, primarily due to the fact that Mesh endpoints and field devices are designed to roam and/or migrate from one Field Area Router to another, while preserving their IP addresses, thus precluding the use of static routes. If static routing is being used, Personal Area Network ("PAN") migration of a field device router breaks routing, since the subnet attached to the field device router is unknown via the new FAR. In current implementation models, field device routers may only be used in a FAN if dynamic routing protocols are used over the VPN tunnel or if there no PAN migration between FARs. Neither of these conditions is particularly acceptable in an IoT network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 illustrates the format of a IKEv2 Notify Payload that may be used in connection with techniques for providing dynamic routing updates in FAN deployments using IKEv2 may be deployed in accordance with embodiments described herein;

DETAILED DESCRIPTION OF EXAMPLE EMBODIMENTS

Overview

Figure 1:
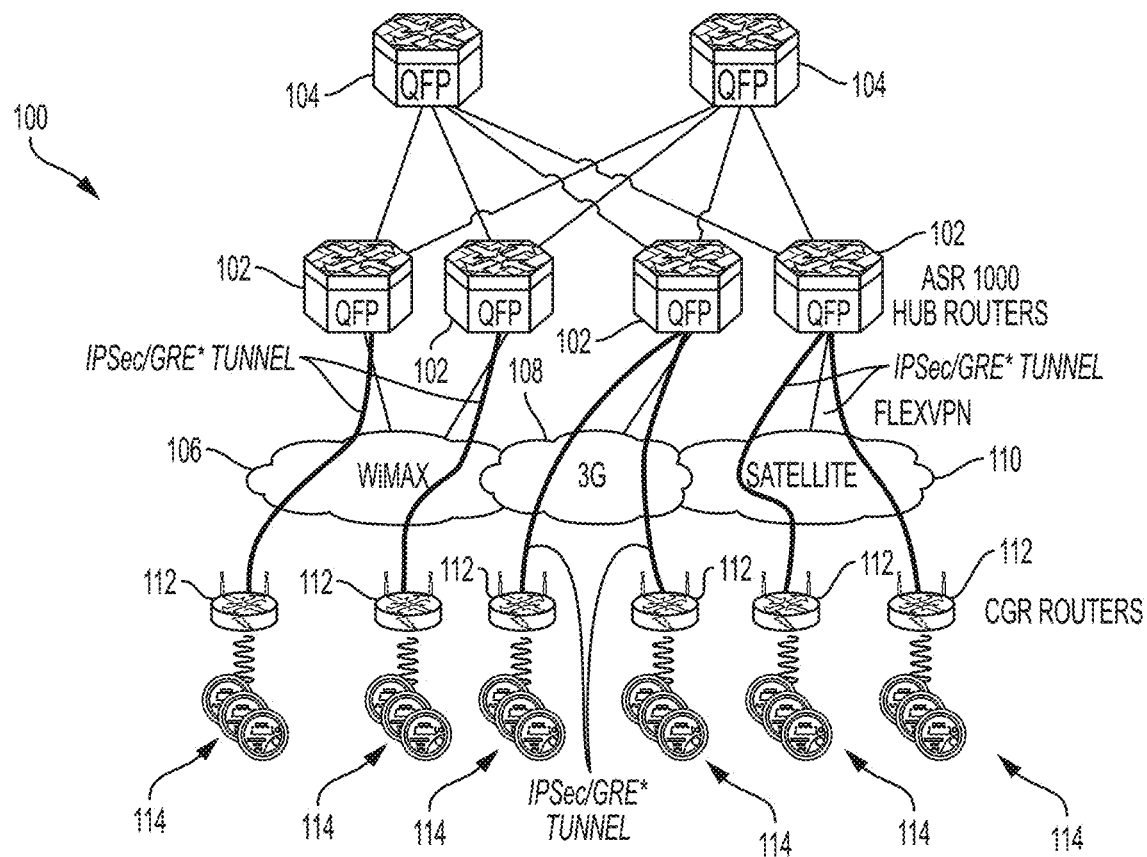
FIG. 1 is a simplified block diagram of a communications network in which embodiments described herein for implementing techniques for providing dynamic routing updates in FAN deployments using IKEv2 may be deployed.

A method is described and in one embodiment includes identifying at an initiator element a list of Internet protocol ("IP") prefixes corresponding to routes designated as interesting routes, wherein the IP prefixes are included in a Routing Information Base ("RIB") of the initiator; monitoring the RIB for a change in the list of IP prefixes; and, responsive to detection of a change in the list of IP prefixes, injecting at least a portion of the changed list of IP prefixes into a payload of an IKEv2 NOTIFY message and sending the IKEv2 NOTIFY message to a responder element peered with the initiator element, wherein the responder element updates an RIB of the responder element using the IP prefixes included in the received IKEv2 NOTIFY message.

Example Embodiments

As noted above, FANs are based on a hub-and-spoke topology between a hub router, which may be implemented as a Cloud Services Router ("CSR"), and multiple spoke routers, which may be implemented as a Connected Grid Router ("CGR"). The enormity of IoT networks necessitates that there be anywhere from a few hundred to many thousand FARs connected back to a cluster of hub routers via IPsec VPN tunnels.

When setting up IKE/IPsec tunnels, there currently exist methods for exchanging Security Associations ("SAs"), as detailed in RFC 5996 entitled "Internet Key Exchange Protocol Version 2 (IKEv2)" (hereinafter referred to as "RFC 5996"). Such methods may include SAs corresponding to IP security policy, in which peers exchange protected subnetworks as encoded in the security policy. For example, an initiator may send the following message to a responder:

HDR, SK {SA, Ni, [KEi], TSi, TSr, [CFG_req]} and the responder may respond with the following message:

HDR, SK {SA, Nr, [KEr], TSi, TSr, [CFG_reply]} where TSi and TSr are the Traffic Selectors ("TS") of the initiator (i) and responder (r), respectively, and CFG_req and CFG_reply are configuration request and configuration reply, respectively, containing additional information about the interpretation of the TSr response. When configuration requests are not used, the most common implementation is based on a static security policy that lists the network local to the initiator and the networks local to the responder. These static definitions are translated as such into TSi and TSr. This matches the exchange above without the optional CFG payloads.

Another method of exchanging SAs is through exchanges of configuration attributes, as detailed in section 3.16.2 of RFC 5996. In summary, these exchanges are based on two types of payloads (four total grouped into two pairs), including: (1) config request/config reply payloads; and (2) config set/config ack payloads. Configuration attributes are used to exchange various parameters, such as internal IPv6/IPv6 address, NetBIOS Naming Service ("NBNS"), Domain Name Service ("DNS"), and/or Dynamic Host Configuration Protocol ("DHCP") requests, etc., and can be augmented beyond those specified in RFC 5996. INTERNAL_IP4_SUBNET and INTERNAL_IP6_SUBNET are significant configuration attributes, as described herienbelow. Industrywide, these parameters are only exchanged at negotiation time and only once.

Yet another method of exchanging SAs is as augmented by INTERNAL_IP4/6_SUBNET. Due to implementation and optimization purposes, as well as because it is common practice, the initiator generally sends:

CP(CFG_REQUEST)=INTERNAL_IP4_ADDRESS( )
TSi=(0, 0-65535, 10.0.0.1-10.0.0.254)
TSr=(0, 0-65535, 0.0.0.0-255.255.255.255) ## a wildcard policy and the responder replies with:

CP(CFG_REPLY)=
 INTERNAL_IP4_ADDRESS(198.51.100.234)
 INTERNAL_IP4_SUBNET(192.0.0.0/255.255.255.0)
  ## actual responder selector 1
 INTERNAL_IP4_SUBNET(172.16.0.0/255.255.0.0)
  ## actual responder selector 2 . . . ## More selectors if necessary
TSi=(0, 0-65535, 10.0.0.1-10.0.0.254) ## copying what the initiator sent
TSr=(0, 0-65535, 0.0.0.0-255.255.255.255) ## wildcard The initiator will thus only protect traffic going from 10.0.0.1-10.0.0.254→192.0.0.0/255.255.255.0, 10.0.0.1-10.0.0.254→172.16.0.0/255.255.0.0 (and any more for which INTERNAL_IP4_SUBNET are sent).

Another typical implementation is tunnel-based. In this scenario, a tunnel is a software interface, which means it appears as a network interface (or equivalent) to the operating system, but does not possess any hardware instantiation. The tunnel interface will assume an encapsulation such as, but not limited to, GRE, IP-in-IP, or IPsec. The tunneled traffic will be protected using a security policy exchange as follows (assuming a GRE tunnel is used):

Initiator:
 TSi=(47, 0-65535, 200.0.0.1-200.0.0.1) ## physical address of initiator
 TSr=(47, 0-65535, 197.0.0.01-197.0.0.1) ## physical address of responder
Responder:
 TSi=(47, 0-65535, 200.0.0.1-200.0.0.1) ## Physical address of initiator
 TSr=(47, 0-65535, 197.0.0.01-197.0.0.1) ## Physical address of responder The security association will therefore exclusively protect the traffic transported by the tunnel. Likewise, a pure IPsec tunnel (no GRE) can be defined as:

Initiator:
 TSi=(0, 0-65535, 0.0.0.0-255.255.255.255)
 TSr=(0, 0-65535, 0.0.0.0-255.255.255.255)
Responder:
 TSi=(0, 0-65535, 0.0.0.0-255.255.255.255)
 TSr=(0, 0-65535, 0.0.0.0-255.255.255.255)

where everything is encrypted.

In either of the above methods, the security association is attached to a pseudo-interface type tunnel and is used as a post-encapsulation method (e.g., after the GRE, IP-in-IP, or any other encapsulation). The private traffic is then protected by instructing the Routing Information Base ("RIB"), or routing table, to send the sensitive traffic into the tunnel:

RIB Initiator:
 192.168.0.0/16→Tunnel0
 172.16.0.0/16→Tunnel0

The RIB itself it typically programmed by a routing control plane that can include statically defined routes (a.k.a., static routes) and a routing protocol of choice (e.g., Open Shortest Path First ("OSPF"), Enhanced Interior Gateway Routing Protocol ("EIGRP"), Border Gateway Protocol ("BGP"), etc.). This particular method separates the security policy from the network routing topology; in many cases, the IPsec security policy is a mere static copy of a dynamic topology. Additionally, in this method instantiation only focuses on the destination IP address of the traffic, making the lookups more efficient. Finally, the systems can be optimized with IPsec having relatively static policies from tunnel endpoint to tunnel endpoint, while the dynamicity of the traffic policy is ensured by routing protocols and an RIB that are built for that purpose. The main limitation of this method is lack of scalability of the routing protocols in a well-known topology referred to as "hub & spoke." In a hub & spoke topology, a central device (i.e., the "hub") has to establish thousands of routing protocol peering connections (with the "spokes"), in addition to IKE peering.

In accordance with features of embodiments described herein for implementing IKEv2 dynamic routing, SAs are attached to and protect a tunnel pseudo-interface using the tunnel based mechanism described hereinabove. A configuration attribute (IP4_subnet/IP6_subnet) is used to point specific prefixes to a protected tunnel interface, effectively augmenting the RIB population methods with a new method. The configuration attribute may be resent at any time during the lifetime of the SA in order to alter and/or augment the security policy. The IP4_subnet/IP6_subnet attributes may be filtered by a receiving device policy in order to enforce a global security policy and may convey additional information, such as path cost or other form of desirability. The IP prefixes identified by the IP4_subnet and IP6_subnet attributes may have imposed thereon further refinement by the receiving host in order to adjust the desirability.

Certain embodiments described herein implement a system for achieving limited dynamic reachability updates on both end of a VPN tunnel in a FAN without the use of a dynamic routing protocol, such as Open Shortest Path First ("OSPF"), Enhanced Interior Gateway Routing Protocol ("EIGRP"), or Border Gateway Protocol ("BGP"). IKEv2 is a protocol used to establish a security association ("SA") in the IPsec protocol suite. As described in RFC 5996, IKEv2 is capable of injecting static routing prefixes; however, such prefixes are only injected when two peers authenticate each other during the IKEv2_AUTH phase. Current implementations of IKEv2 lack the ability to exchange or update prefixes dynamically during the lifetime of the IKEv2 SA based on changes detected in a Routing Information Base ("RIB"), or routing table, of a router at one end of the VPN tunnel, for example. For example, when a mesh field device router migrates to a new PAN on a FAR, Its local and fixed IPv6 address is installed in the RIB on the FAR; however, for the mesh field device router to be reached via the new FAR, the route needs to be advertised to the head-end, or hub router, to be reachable by the rest of the network.

In accordance with features of embodiments described herein, route exchanges using IKEv2 should occur in a single, possibly fragmented (more optimally at IKEv2 level; less optimally at IP level), IKEv2 notification. As described herein in greater detail, in accordance with various embodiments, IKEv2 is extended to provide relevant dynamic routing for various use cases in which routing updates are event driven (e.g., using a snapshot routing method), in which the burden of additional protocols (e.g., process, negotiation, peering tables, etc.) is already maintained by IKEv2, and which are resistant to packet losses. Because of the nature of IKEv2, the embodiments described herein may provide cryptographically guaranteed, identity-based route injection, filtering and other manipulation.

FIG. 1 is a simplified block diagram of a network, such as a Field Area Network, 100 in which embodiments described herein for implementing techniques for providing dynamic routing updates in FAN deployments using IKEv2 may be deployed. As shown in FIG. 1, the network 100 includes numerous hub routers, illustrated in FIG. 1 by hub routers 102, which in the illustrated embodiment are interconnected via aggregation routers 104. In large networks, many hub routers may be required, in which case aggregation routers may be used to provide an aggregation point for the hub routers. In certain embodiments, each of hub routers 102 is implemented as a CSR. IPsec/GRE tunnels 105 are provided over various ones of wireless networks, including, for example WiMax 106, 3G 108, and satellite 110, between hub routers 102 and various ones of several grid routers, or Field Area Routers ("CGRs"), 112, each of which may be implemented as a Cisco 1000 Series Connected Grid Router ("CGR"). A plurality of endpoints 114, each of which may comprise a meter or other data acquisition device, are connected to each of the grid routers 112. In certain embodiments, one or more endpoints 114 may include a Cisco IR 500 Series device, such as the IR509.

In accordance with features of embodiments described herein, IPsec VPNs may be configured on IOS platforms using IKEv2. In certain embodiments, Generic Routing Encapsulation ("GRE")-over-IPsec is used for encapsulation, allowing almost anything to be transported over the tunnel while IPsec provides security for payloads. IPv6 and IPv4 are supported for transport and overlay protocol.

Figure 2:
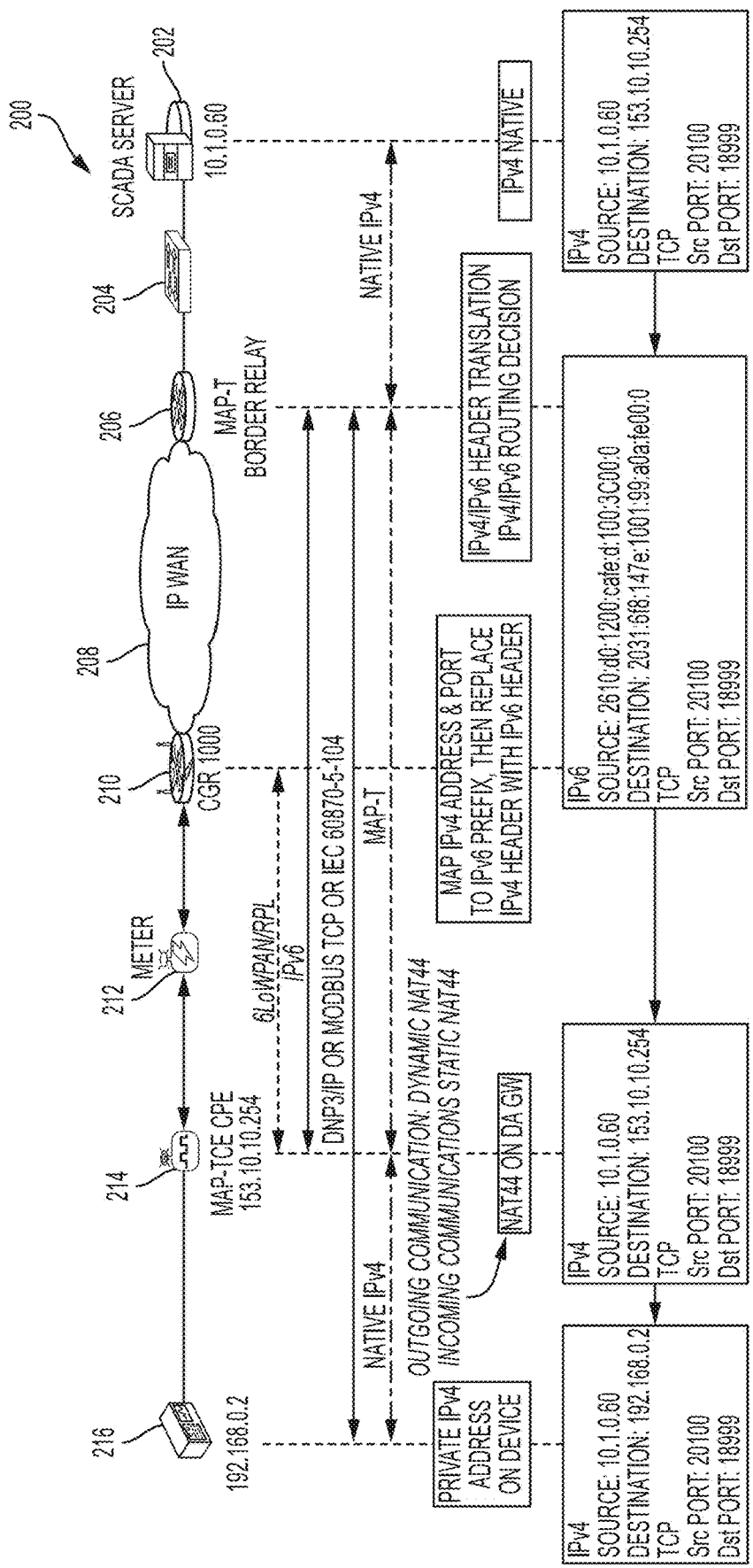
FIG. 2 is a simplified block diagram illustrating end-to-end IPv6 addressing and routing in a FAN in which Wireless Personal Area Network ("WPAN") routing devices are deployed.

FIG. 2 is a simplified block diagram illustrating end-to-end IPv6 addressing and routing in a network 200, such as a FAN, in which IR509 devices are deployed. As shown in FIG. 2, the network 200 includes a SCADA server 202, a MAP-T border relay 206 connected to a CGR 210 via IP WAN 208, a WPAN extender 212, a WPAN gateway device 214, and an endpoint device 216. It will be noted that the IP address of the SCADA server 202 is 10.1.0.60, the IP address of the WPAN gateway 214 is 153.10.10.254, and the IP address of the endpoint is 192.160.0.2. As shown in FIG. 2, addressing between WPAN gateway 214 and CGR 210 is implemented using 6LoWPAN/RPL. Addressing between WPAN 214 and MAP-T border relay 206 is implemented using IPv6 and MAP-T. Addressing between an endpoint controller 216 and WPAN gateway 214, as well as between MAP-T border relay 106 and SCADA server 202, is implemented using Native IPv4.

MAP-T was developed as a transition mechanism due to IPv4 address exhaustion and is based on a double stateless NAT64 translation. MAP-T specifies a stateless algorithmic address and transport layer port mapping scheme and allows embedding of IPv4 address and port numbers in an IPv6 address when forwarding the IPv4 traffic across an IPv6-only network.

When MAP-T is used in a WPAN gateway, the IPv4 address of the attached device can be a private address with local significance only, since the traffic goes through NAT44. In a FAN scenario in which hundreds of WPAN gateways are deployed across multiple CGRs, a MAP-T begins at the WPAN gateway level and ends with the head-end aggregation routers (such as ASR1000), as shown in FIG. 2. It also means a single MAP-T Basic Mapping Rule ("BMR") prefix.

In one use case scenario, when an IR509 router connects to an IEEE 802.15.4e/g CG-mesh network and MAP-T is used (which may be common for power utilities), the internal IPv6 Basic Mapping Rule ("BMR") address on the IR509 needs to be reachable from the MAP-T BR. The route to the MAP-T BMR IPv6 address of the IR509 is installed in the CGR RIB as a/128 prefix; however, unless the head-end, or hub, router has a route to this address through the correct VPN tunnel, the internal address of the IR509 is not reachable.

Figure 3:
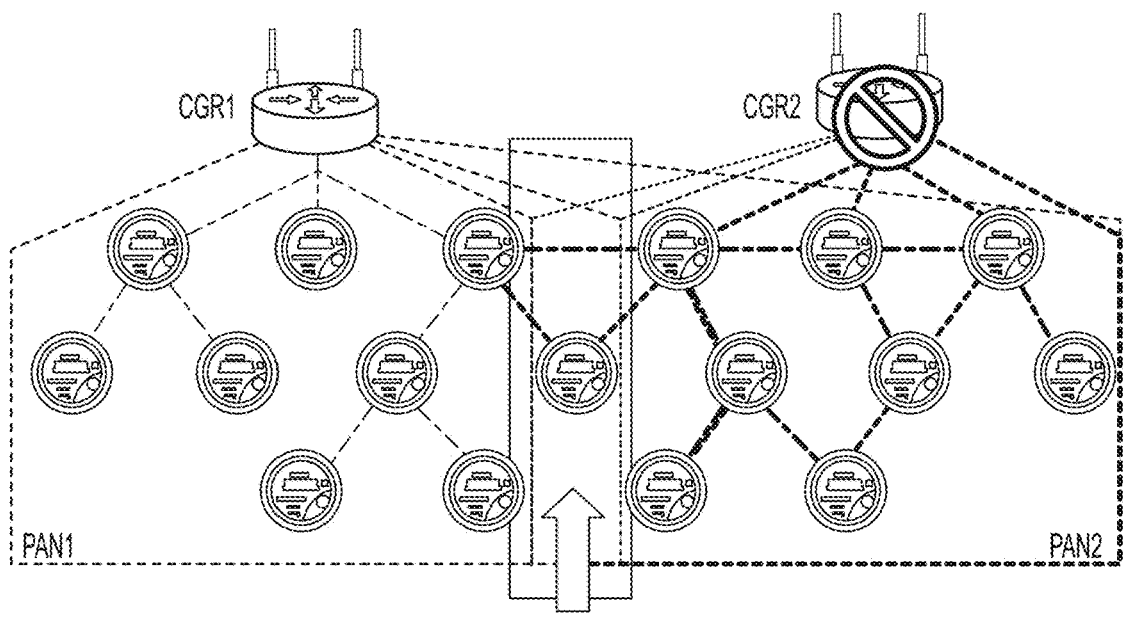
FIG. 3 is a simplified block diagram of a portion of a FAN illustrating consequences of a PAN migration of a grid endpoint device.

In situations in which all of the IR509's are attached to a single grid router, static routes will suffice, however, in cases where there are more than one grid router, each of them must dynamically announce to their upstream hub router the BMR IPv6 address of each IR509 connected locally to their mesh network. During a PAN migration, in which an IR509 roams from the RF mesh of one grid router to that of another (as illustrated in FIG. 3), routing will break down unless dynamic routing is used between the CGR and the Hub router. PAN migrations are a regular occurrence in FAN deployments in which the grid endpoints are able to see more than one CGR.

In accordance with features of embodiments described herein, limited dynamic reachability updates on both ends of the IPsec/GRE tunnel may be accomplished without using a dynamic routing protocol, such as OSPF, EIGRP or BGP. For example, when an IR509 migrates to a new PAN on a CGR, as illustrated in FIG. 3, its IPv6 BMR address appears in the routing table of the CGR.

As previously noted, IPv6 routes related to the IR509 are installed in the RIB on the CGR, but a route for the IR509 needs to be advertised to the head-end (hub) router at the other end of the VPN so that the IR509 can be reachable by the rest of the network. The IPv6 MAP-T route must be associated to the CGR tunnel path connecting the IR509. Additionally, when an IR509 migrates to a CGR that is a spoke of a completely different head-end router, the new head-end router will also need to know how to reach this WPAN. When using MAP-T, this requires that the head-end Dynamic Mapping Rule ("DMR") address also be advertised down to the CGR through IKEv2, as will be described.

Figure 4:
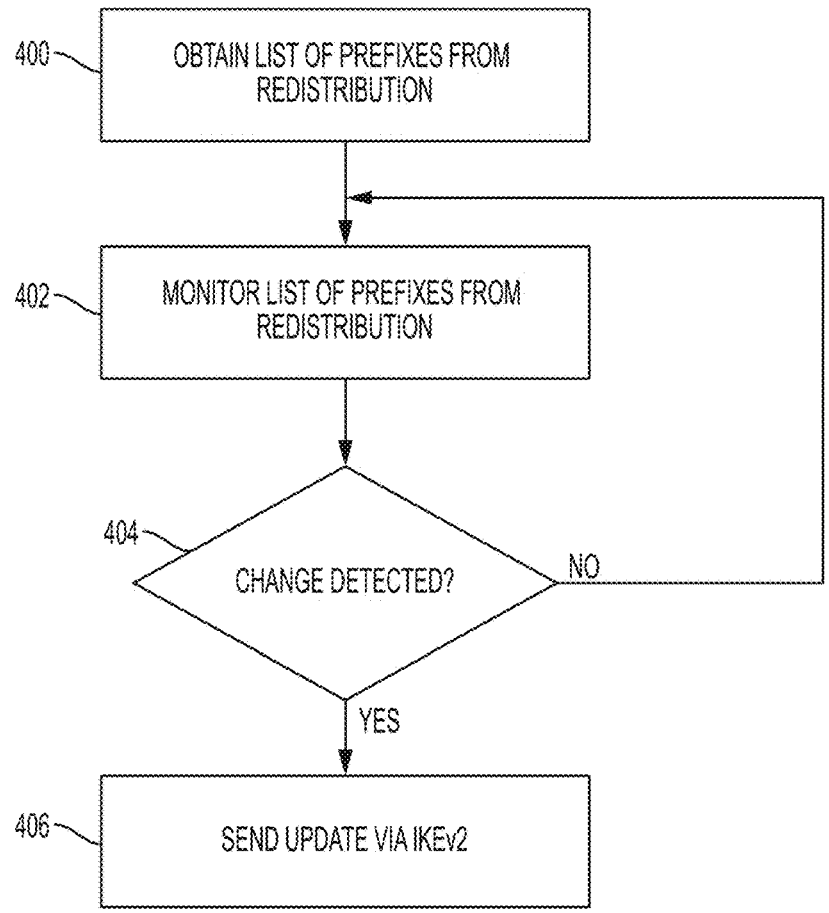
FIG. 4 is a flow diagram illustrating steps that may be performed for implementing techniques for providing dynamic routing updates in FAN deployments using IKEv2 may be deployed in accordance with embodiments described herein.

FIG. 4 is a flowchart illustrating steps that may be performed at a CGR, or spoke router, in implementing end-to-end IPv6 addressing and routing in a FAN in which WPAN routing devices are deployed. Referring to step 400, as in any redistribution scenario in which a router is deployed at the boundary between two routing domains, a list of prefixes that should be injected from one domain to the other must be carefully controlled to avoid routing loops or non-optimum paths. In particular, which prefixes installed in the RIB (regardless of the respective routing protocols by which they were each installed) should be injected into IKEv2 are clearly identified in step 400. Classic techniques like Access Control List ("ACL") and route-map can be used to define matching criteria each prefix installed in the RIB can be matched against. For example, IPv4/IPv6 prefixes with a subnet mask length or type of route (static, connected, OSPF, etc.) are common criteria. Once the prefixes have been identified in step 400, in step 402, IKEv2 may register them with the RIB. In step 404, a determination is made whether there has been a change in the RIB. Such a change may include removal of a prefix from the RIB or addition of a new prefix matching preconfigured criteria.

Responsive to a positive determination in step 404, execution proceeds to step 406, in which IKEv2 updates are sent to reflect the detected changes. To keep the implementation stateless, the entire list of prefixes (even those not affected by the detected change(s) should be sent each time. The result is an event-driven approach that is more efficient than running a scan on a regular (scheduled) basis. To notify its peer to withdraw a route, the router will not list that specific prefix in the next IKEv2 update.

In summary, embodiments descried herein enable Route Policy Language ("RPL") routes to be injected into the IKE routing process to enable the IKE process to advertise them up the VPN tunnel to the hub router. As a result, the advertisement of the routes into IKE is performed dynamically in response to a change in the RIB.

The IKEv2 routing updates should be a snapshot of the RIB and are completely stateless; that is, peer A (e.g., grid router) sends peer B (e.g., hub router) its full set of interesting routes (i.e., routes that are of import to the network) each time a route change must be advertised. Additionally, although differential updates would be less optimum, such updates would also be possible. An update may be empty, meaning that a peer wishes to withdraw all of its dynamic routes (e.g., if an IR509 has roamed away to another CGR, leaving no dynamic routes to be advertised). The IKEv2 routing updates should be entirely event driven and throttled. In particular, the process should look for events to track in the RIB and updates are sent to the peer only if a change to one or more interesting routes was detected. In particular, the RIB is monitored to detect changes in RPL routes designated as interesting. If one of those routes changes, the process should instantly trigger an update that is sent to the IKE routing process.

A mechanism referred to as a "dampener" may be provided to throttle updates. The dampener may have a user configurable dampener period, which may be set to a recommended default value (e.g., 10 seconds). If a routing update should be sent (on event) faster than the dampener allows, the routing update must be throttled down to the dampener value, which is used when a route is flapping (e.g., an IR509 is roaming back and forth every few seconds to different CGRs), causing instability in the core network and overwhelming routing tables. If an update is throttled out, the next update must be sent at the end of the dampener period and the update must contain the latest status of the local RIB at the time the message is sent (no backlog, no buffer). These messages should be based on out-of-band IKEv2 acknowledged notifications. Such a "Notify" message may be passed as early as Messages 3 and 4 of the IKEv2 exchange. On the receiving end, a route message must be processed ASAP but may be queued for processing if necessary. If a new message from a peer is received before a previous one from the same peer gets processed, the old message can be discarded (with an event-trace notification) and the new one must be queued for processing without losing its turn in the processing queue.

An IKEv2 Notify payload may be used to carry the prefix. It is conceivable that certain routing metrics, such as administrative distance, may also be carried in the same manner. The exchange must be symmetric, with each peer being able to advertise prefixes to each other to control the routing path both ways. A CGR may have multiple tunnels for redundancy purposes terminated on different Hubs. Extra route attributes in addition of the prefix and its mask length like tag and metrics should also be exchanged to implement advanced and scalable routing policies especially when a peer may receive the same prefix from several hubs. When defining the redistribution criteria's using a route-map for example, we must be able to set a tag and/or a metric value associated to each prefix. Other integration point would include:

AAA: The hub router may receive its redistribution policy from a AAA server. That will allow to store the policy at one place and configured multiple Hubs.
   VRF: If the tunnel is associated to a virtual forwarding instance, any IKEv2 route received attached to that tunnel must also be installed in the same VRF.
   Route insertion into the RIB: A peer may not want to blindly trust any IKEv2 update received and so may need a filtering mechanism to select which prefixes part of the update should be installed into the RIB.

An IKEv2 Notify payload may be used to carry the prefix. It is conceivable that certain routing metrics, such as administrative distance, may also be carried in the same manner. The exchange must be symmetric, with each peer being able to advertise prefixes to each other. For example, the process may be used to advertise routes over IKE to a CGR to designate a preferred uplink tunnel in cases in which the CGR has multiple uplink tunnels. Redistribution of routes into IKEv2 should be performed through a mechanism to control which prefixes are redistributed and to control extra attributes, such as tags, etc. This enables selection of routes to be redistributed into IKE, since not all of the routes will need to be distributed in that manner. A route-map is appropriate but other mechanisms, such as only redistributing routes with a given tag or a specific prefix length, may be considered. This filter should be applicable via AAA. Additionally, RIB insertion should also be controlled by a filtering mechanism. At minimum, the received prefixes should undergo the existing "route accept" statement, meaning that if it passes an ACL check, it is accepted. Embodiments described herein work in addition to "route set local". The prefixes should be injected in the VRF where the tunnel or V-access belongs (VRF forwarding), exactly like static prefixes currently exchanged in IKEv2; no particular CLI is needed.

When an update is received at the hub router, it may be injected into the routing table as an IKE (or static) route. From there, the static route may be redistributed in the normal routing protocol used in the core network (e.g., OSPF).

The Notify Payload is used in IKEv2 to transmit informational data, such as error conditions and state transitions, from one IKE peer to another. A Notify Payload may appear in a response message (usually specifying why a request was rejected), in an INFORMATIONAL exchange (to report an error not in an IKE request), or in any other message to indicate sender capabilities or to modify the meaning of the request.

FIG. 5 illustrates the format of the IKEv2 Notify Payload. The various fields are defined as follows:

Protocol ID (1 octet)—If this notification concerns an existing SA, this field indicates the type of that SA. For IKE_SA notifications, this field MUST be one (1). For notifications concerning IPsec SAs this field MUST contain either (2) to indicate AH or (3) to indicate ESP. For notifications that do not relate to an existing SA, this field MUST be sent as zero and MUST be ignored on receipt. All other values for this field are reserved to IANA for future assignment.

SPI Size (1 octet)—Length in octets of the SPI as defined by the IPsec protocol ID or zero if no SPI is applicable. For a notification concerning the IKE_SA, the SPI Size MUST be zero.

Notify Message Type (2 octets)—Specifies the type of notification message.

SPI (variable length)—Security Parameter Index.

Notification Data (variable length)—Informational or error data transmitted in addition to the Notify Message Type. Values for this field are type specific Embodiments described herein have a variety of applications in situations in which deploying a dynamic routing protocol over a VPN tunnel is not preferable. For example, possible use cases for IKEv2 Prefix Injection include dual homing of a CGR spoke router, in which the VPN network has multiple hubs and redundant VPN connections are used. In this situation, the embodiments described would enable advertisement of routes and dynamic failover to backup tunnels without using an IGP. Another use case includes another massive VPN spoke router scale with security; using IKEv2 prefix injection, it is possible to authenticate routes before redistribution and they can be recorded by syslog. This can be performed on a massive scale and cannot be accomplished by a routing protocol. Use of embodiments described herein would add more security to a hub-and-spoke VPN architecture beyond what and dynamic routing protocol may be able to accomplish. Additionally, embodiments described herein would provide the ability to add uRPF checks.

Figure 6A:
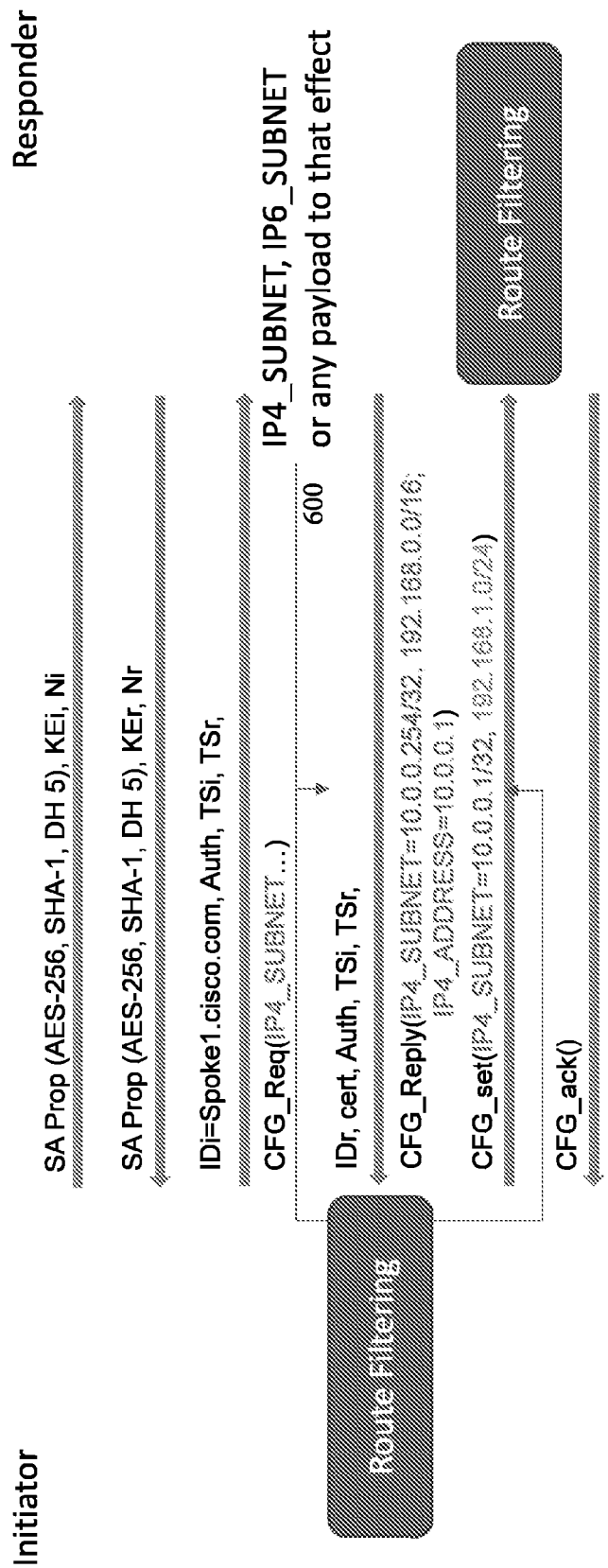
FIGS. 6A and 6B illustrate exchanges that may be made between an initiator and a responder in connection with techniques for providing dynamic routing updates in FAN deployments using IKEv2 in accordance with embodiments described herein.
Figure 6B:
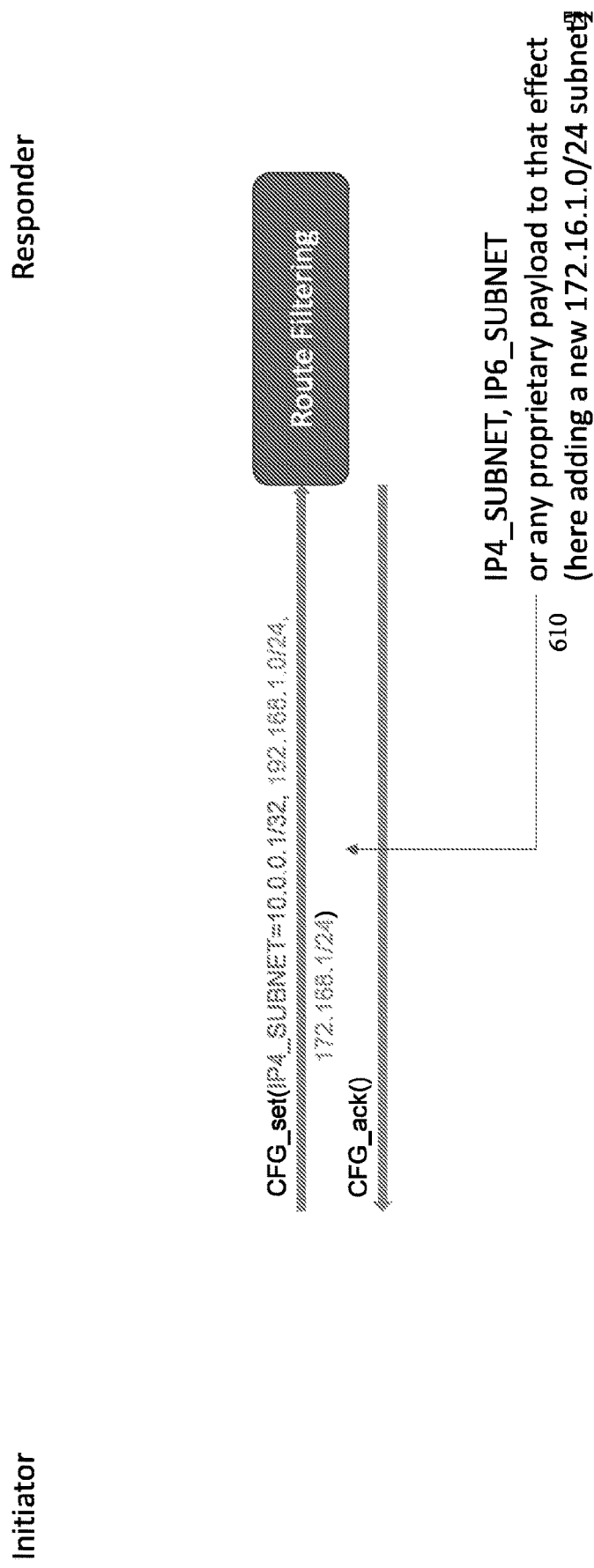

FIG. 6A is a flow diagram illustrating an example initial exchange 600 that may be made between an initiator and responder in connection with techniques for providing dynamic routing updates in FAN deployments using IKEv2 in accordance with embodiments described herein. FIG. 6B is a flow diagram illustrating an example dynamic route update exchange 610 that may be made between an initiator and responder in connection with techniques for providing dynamic routing updates in FAN deployments using IKEv2 in accordance with embodiments described herein.

Figure 7:
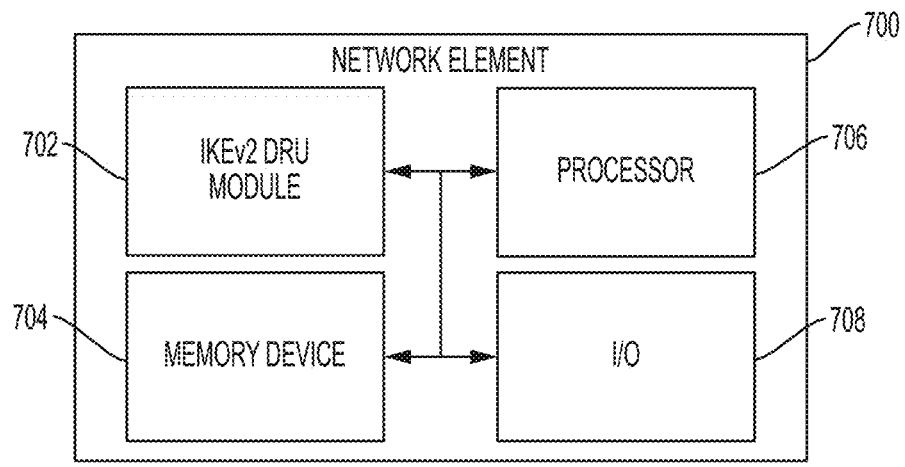
FIG. 7 is a simplified block diagram of a network element in which embodiments described herein for implementing techniques for providing dynamic routing updates in FAN deployments using IKEv2 may be deployed.

Referring to FIG. 7, illustrated therein is network element 700, which in certain embodiment may be CGR, CSR, or ASR such as shown and described in the preceding FIGURES. In accordance with features of embodiments described herein, the network element 700 includes an IKEv2 dynamic routing update ("DRU") module 702, which may include software embodied in one or more tangible media for facilitating the activities described herein. In particular, the module 702 may include software for facilitating the processes illustrated in and described with reference to FIG. 4. The network element 700 may also include a memory device 704 for storing information to be used in achieving the functions as outlined herein. Additionally, the network element 700 may include a processor 706 that is capable of executing software or an algorithm (such as embodied in module 702) to perform the functions as discussed in this Specification. The network element 700 may also include various I/O 708 necessary for performing functions described herein.

It will be recognized that the network element 700 shown in FIG. 7, as well as other network devices shown and described herein, may be implemented using one or more computer devices comprising software embodied in one or more tangible media for facilitating the activities described herein. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and specifically illustrated in FIG. 4 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIG. 4. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Figure 8:
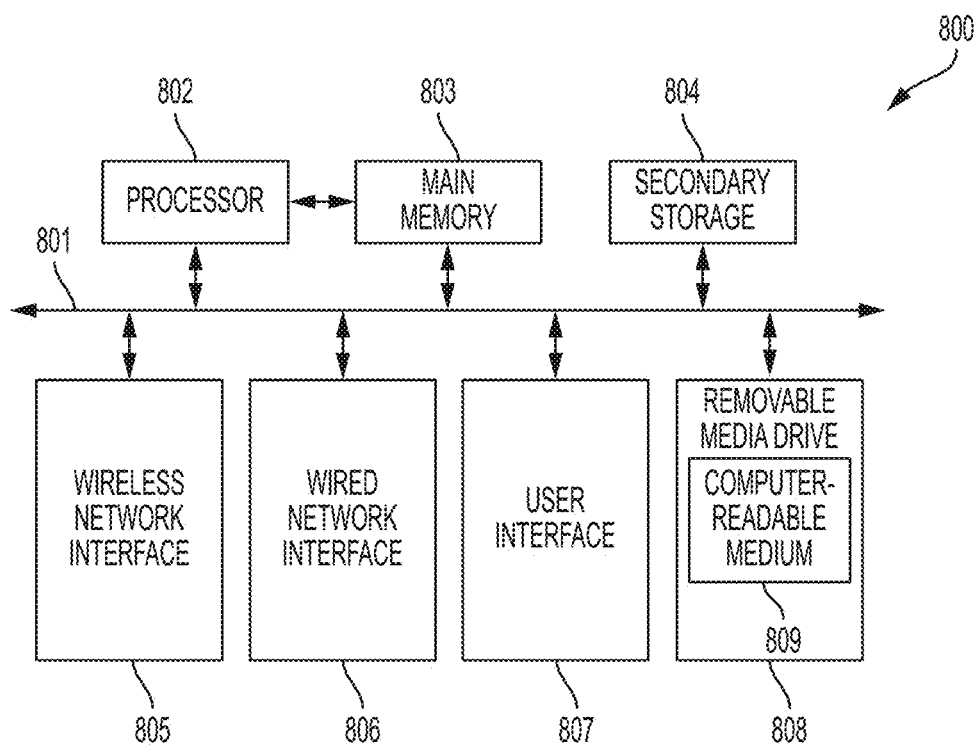
FIG. 8 illustrates a machine comprising an element of the various networks described herein in which embodiments described herein for implementing techniques for providing dynamic routing updates in FAN deployments using IKEv2 may be deployed.

Turning to FIG. 8, illustrated therein is a simplified block diagram of an example machine (or apparatus) 800 that may be implemented as an element of a system for use in implementing a technique for enabling dynamic update of network device data models in accordance with embodiments described herein. The example machine 800 corresponds to network elements and computing devices that may be deployed in any one of the networks illustrated and described herein, such as networks 100 and 200, including routers shown therein. In particular, FIG. 8 illustrates a block diagram representation of an example form of a machine within which software and hardware cause machine 800 to perform any one or more of the activities or operations discussed herein. As shown in FIG. 8, machine 800 may include a processor 802, a main memory 803, secondary storage 804, a wireless network interface 805, a wired network interface 806, a user interface 807, and a removable media drive 808 including a computer-readable medium 809. A bus 801, such as a system bus and a memory bus, may provide electronic communication between processor 802 and the memory, drives, interfaces, and other components of machine 800.

Processor 802, which may also be referred to as a central processing unit ("CPU"), can include any general or special-purpose processor capable of executing machine readable instructions and performing operations on data as instructed by the machine readable instructions. Main memory 803 may be directly accessible to processor 802 for accessing machine instructions and may be in the form of random access memory ("RAM") or any type of dynamic storage (e.g., dynamic random access memory ("DRAM")). Secondary storage 804 can be any non-volatile memory such as a hard disk, which is capable of storing electronic data including executable software files. Externally stored electronic data may be provided to computer 800 through one or more removable media drives 808, which may be configured to receive any type of external media such as compact discs ("CDs"), digital video discs ("DVDs"), flash drives, external hard drives, etc.

Wireless and wired network interfaces 805 and 806 can be provided to enable electronic communication between machine 800 and other machines via networks (e.g., control plane 108, data plane 110. In one example, wireless network interface 805 could include a wireless network controller ("WNIC") with suitable transmitting and receiving components, such as transceivers, for wirelessly communicating within a network. Wired network interface 806 can enable machine 800 to physically connect to a network by a wire line such as an Ethernet cable. Both wireless and wired network interfaces 805 and 806 may be configured to facilitate communications using suitable communication protocols such as, for example, Internet Protocol Suite ("TCP/IP"). Machine 800 is shown with both wireless and wired network interfaces 805 and 806 for illustrative purposes only. While one or more wireless and hardwire interfaces may be provided in machine 800, or externally connected to machine 800, only one connection option is needed to enable connection of machine 800 to a network.

A user interface 807 may be provided in some machines to allow a user to interact with the machine 800. User interface 807 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 808 represents a drive configured to receive any type of external computer-readable media (e.g., computer-readable medium 809). Instructions embodying the activities or functions described herein may be stored on one or more external computer-readable media. Additionally, such instructions may also, or alternatively, reside at least partially within a memory element (e.g., in main memory 803 or cache memory of processor 802) of machine 800 during execution, or within a non-volatile memory element (e.g., secondary storage 804) of machine 800. Accordingly, other memory elements of machine 800 also constitute computer-readable media. Thus, "computer-readable medium" is meant to include any medium that is capable of storing instructions for execution by machine 800 that cause the machine to perform any one or more of the activities disclosed herein.

Not shown in FIG. 8 is additional hardware that may be suitably coupled to processor 802 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 800 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 800 to appropriately manage the operation of the hardware components therein.

The elements, shown and/or described with reference to machine 800, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein (e.g., the steps shown in FIG. 4) may be implemented in software in, for example, leaf nodes. In some embodiments, this software could be received or downloaded from a web server, provided on computer-readable media, or configured by a manufacturer of a particular element in order to provide this system for implementing autonomic LISP for enabling a secure hybrid cloud extension in accordance with features of embodiments described herein. In some embodiments, one or more of these features may be implemented in hardware, provided external to these elements, or consolidated in any appropriate manner to achieve the intended functionality.

In one example implementation, leaf and spine nodes are network devices or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 803, secondary storage 804, computer-readable medium 809) can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 802) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of networks illustrated herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    identifying at an initiator element a list of Internet protocol (IP) prefixes corresponding to routes designated as interesting routes, wherein the IP prefixes are included in a Routing Information Base (RIB) of the initiator element;
    monitoring the RIB for a change in the list of IP prefixes;
    responsive to detection of a change in the list of IP prefixes:
        injecting all of the changed list of IP prefixes into a payload of an Internet Key Exchange v2 (IKEv2) NOTIFY message;
        sending the IKEv2 NOTIFY message to a responder element peered with the initiator element, wherein the responder element updates a RIB of the responder element using the changed list of IP prefixes included in the IKEv2 NOTIFY message; and
        throttling the injecting and the sending if a period of time identified by a configurable dampener period has not expired since a previous IKEv2 NOTIFY message was sent, wherein the sending includes sending the IKEv2 NOTIFY message at an end of the configurable dampener period.

2. The method of claim 1, wherein the identifying comprises using at least one of an Access Control List (ACL) and a route-map to identify the IP prefixes corresponding to interesting routes.

3. The method of claim 1, wherein the detected change comprises an addition to the RIB of the initiator element of an IP address corresponding to an interesting route.

4. The method of claim 1, wherein the detected change comprises a deletion from the RIB of the initiator element of an IP address corresponding to an interesting route.

5. The method of claim 1, wherein the initiator element comprises a spoke router of a Field Area Network (FAN), the responder element comprises a hub router of the FAN, and wherein the change in the list of IP prefixes results from at least one of connection of a Wireless Personal Area Network (WPAN) router to the initiator element and disconnection of the WPAN router from the initiator element.

6. The method of claim 1, wherein each of the interesting routes comprises a Route Policy Language (RPL) route.

7. The method of claim 1, wherein the IKEv2 NOTIFY message is sent via a Virtual Private Network (VPN) connection between the initiator element and the responder element.

8. The method of claim 1, wherein for any routes corresponding to any IP prefixes that are not included in the changed list of IP prefixes, the responder element updates the RIB of the responder element by withdrawing any routes corresponding to any IP prefixes that are not included in the changed list of IP prefixes.

9. The method of claim 1, wherein the changed list of IP prefixes includes a plurality of unchanged IP prefixes that were not affected by the detected change.

10. The method of claim 1, wherein the configurable dampener period is a user configurable dampener period.

11. One or more non-transitory tangible media that includes code for execution and when executed by a processor is operable to perform operations comprising:
    identifying at an initiator element a list of Internet protocol (IP) prefixes corresponding to routes designated as interesting routes, wherein the IP prefixes are included in a Routing Information Base (RIB) of the initiator element;
    monitoring the RIB for a change in the list of IP prefixes;
    responsive to detection of a change in the list of IP prefixes:
        injecting all of the changed list of IP prefixes into a payload of an Internet Key Exchange v2 (IKEv2) NOTIFY message;
        sending the IKEv2 NOTIFY message to a responder element peered with the initiator element, wherein the responder element updates a RIB of the responder element using the changed list IP prefixes included in the IKEv2 NOTIFY message; and
        throttling the injecting and the sending if a period of time identified by a configurable dampener period has not expired since a previous IKEv2 NOTIFY message was sent, wherein the sending includes sending the IKEv2 NOTIFY message at an end of the configurable dampener period.

12. The one or more non-transitory tangible media of claim 11, wherein the identifying comprises using at least one of an Access Control List (ACL) and a route-map to identify IP prefixes corresponding to interesting routes.

13. The one or more non-transitory tangible media of claim 11, wherein the detected change comprises at least one of an addition to the RIB of the initiator element of an IP address corresponding to an interesting route and a deletion from the RIB of the initiator element of an IP address corresponding to an interesting route.

14. The one or more non-transitory tangible media of claim 11, wherein the changed list of IP prefixes includes a plurality of unchanged IP prefixes that were not affected by the detected change.

15. An apparatus comprising:
a memory element configured to store data; and
a processor operable to execute instructions associated with the data;
the apparatus configured for:
identifying at an initiator element a list of Internet protocol (IP) prefixes corresponding to routes designated as interesting routes, wherein the IP prefixes are included in a Routing Information Base (RIB) of the initiator element;
monitoring the RIB for a change in the list of IP prefixes;
responsive to detection of a change in the list of IP prefixes:
injecting all of the changed list of IP prefixes into a payload of an Internet Key Exchange (IKEv2) NOTIFY message;
sending the IKEv2 NOTIFY message to a responder element peered with the initiator element, wherein the responder element updates a RIB of the responder element using the changed list IP prefixes included in the IKEv2 NOTIFY message; and
throttling the injecting and sending if a period of time identified by a configurable dampener period has not expired since a previous IKEv2 NOTIFY message was sent, wherein the sending includes sending the IKEv2 NOTIFY message at an end of the configurable dampener period.

16. The apparatus of claim 15, wherein the detected change comprises at least one of an addition to the RIB of the initiator element of an IP address corresponding to an interesting route and a deletion from the RIB of the initiator element of an IP address corresponding to an interesting route.

17. The apparatus of claim 15, wherein the initiator element comprises a spoke router of a Field Area Network (FAN), the responder element comprises a hub router of the FAN, and wherein the change in the list of IP prefixes results from at least one of connection of a Wireless Personal Area Network (WPAN) router to the initiator element and disconnection of the WPAN router from the initiator element.

18. The apparatus of claim 15, wherein the IKEv2 NOTIFY message is sent via a Virtual Private Network (VPN) connection between the initiator element and the responder element.

19. The apparatus of claim 15, wherein each of the interesting routes comprises a Route Policy Language (RPL) route.

20. The apparatus of claim 15, wherein the identifying comprises using at least one of an Access Control List (ACL) and a route-map to identify the IP prefixes corresponding to interesting routes.

* * * * *